United States Patent [19]

Buchholz et al.

[11] Patent Number: 5,736,215

[45] Date of Patent: Apr. 7, 1998

[54] PROCESS FOR THE MANUFACTURE OF A PROFILE PART

[75] Inventors: Hans-Volker Buchholz; Alistair Hill, both of Hildesheim, Germany

[73] Assignee: Meteor Gummiwerke K.H. Bädje GmbH & Co., Bockenem, Germany

[21] Appl. No.: 535,262

[22] PCT Filed: Mar. 19, 1994

[86] PCT No.: PCT/EP94/00868

§ 371 Date: Jan. 11, 1996

§ 102(e) Date: Jan. 11, 1996

[87] PCT Pub. No.: WO94/25246

PCT Pub. Date: Nov. 10, 1994

[30] Foreign Application Priority Data

Apr. 30, 1993 [DE] Germany ............... 43 14 192.7

[51] Int. Cl.⁶ ............................................. B32B 3/06
[52] U.S. Cl. .................. 428/99; 49/490.1; 52/716.5; 264/171; 264/177.1; 264/177.18; 428/31; 428/122; 428/358
[58] Field of Search ................. 428/99, 122, 358, 428/31; 49/490.1; 52/716.5; 264/171, 177.1, 177.18

[56] References Cited

U.S. PATENT DOCUMENTS

| | | | |
|---|---|---|---|
| 4,187,270 | 2/1980 | Bartrum | 264/177.16 |
| 4,381,273 | 4/1983 | Azzola | 264/173 |
| 4,595,546 | 6/1986 | Wheeler, Jr. | 264/236 |
| 5,137,675 | 8/1992 | Rabe | 264/177.16 |
| 5,256,361 | 10/1993 | Keys | 264/177.19 |
| 5,267,846 | 12/1993 | Miyama et al. | 264/177.16 |
| 5,334,458 | 8/1994 | Powers et al. | 156/244.11 |
| 5,411,785 | 5/1995 | Cook | 428/122 |
| 5,415,822 | 5/1995 | Cook | 264/177.18 |
| 5,562,961 | 10/1996 | Buchholz et al. | 428/36.5 |

FOREIGN PATENT DOCUMENTS

| | | |
|---|---|---|
| 0650318 | 4/1992 | Australia . |
| 0209453 | 1/1987 | European Pat. Off. . |
| 0501037 | 9/1992 | European Pat. Off. . |
| 0528560 | 2/1993 | European Pat. Off. . |
| 2310207 | 1/1977 | France . |
| 2572678 | 5/1986 | France . |
| 2059496 | 6/1972 | Germany . |
| 2330605 | 1/1974 | Germany . |
| 3118429 | 11/1982 | Germany . |
| 3435939 | 3/1986 | Germany . |

(List continued on next page.)

OTHER PUBLICATIONS

"Einstig in die Kuntstoffchemie" 3rd Edition by B. Gnauck and P. Fründt, published by Carl Hanser Verlag, Munich, Vienna, 1991, p. 31.

Japanese Abstract, vol. 5, No. 158 (M–091), "Preparation of Hose" Jul. 1981.

Japanese Abstract, vol. 17, No. 368, (M–1443) "Manufacture of Weatherstrip" Sep. 1993.

Gummibereifung Jun. 1988, pp. 48 and 50 "Gummi–ein Werkstoff nach MaB".

Japanese Abstract, vol. 17, No. 483 (M–1472).

*Primary Examiner*—Nasser Ahmad
*Attorney, Agent, or Firm*—Synnestvedt & Lechner

[57] ABSTRACT

A compound profile (43) consists of a fastening section (33) of a thermoplastic plastics material as well as profile sections (30, 31) of elastomeric material, namely a profile section (30) of expanded rubber and a profile section (31) of soft rubber. All sections (30, 31, 33) are fixed to one another by co-extrusion and co-vulcanization. The plastics material fastening section (33) assumes the function of the conventional metallic reinforcement of the compound profile (43). The compound profile (43) can be three-dimensionally shaped in that it is heated up to the plasticization temperature of the fastening section (33), then is brought to the desired shape in a shaping tool, and in that shape is cooled until the fastening section (33) has again returned to its non-plastic state. One thus creates a profile part which is stable in shape.

21 Claims, 5 Drawing Sheets

FOREIGN PATENT DOCUMENTS

| | | |
|---|---|---|
| 3503200 | 5/1986 | Germany . |
| 3627537 | 2/1988 | Germany . |
| 3737891 | 5/1989 | Germany . |
| 3835211 | 4/1990 | Germany . |
| 3934091 | 4/1991 | Germany . |
| 4219344 | 12/1992 | Germany . |
| 57-43849 | 3/1982 | Japan . |
| 61-93222 | 6/1986 | Japan . |
| 62-205132 | 9/1987 | Japan . |
| 214117 | 2/1990 | Japan . |
| 4353421 | 8/1992 | Japan . |
| 524091 | 2/1993 | Japan . |
| 5057827 | 3/1993 | Japan . |
| 557820 | 3/1993 | Japan . |

PROCESS FOR THE MANUFACTURE OF A PROFILE PART

BACKGROUND

The invention relates to a process for the manufacture of a profile part in which at least one profile section of an elastomeric material is connected to at least one fastening section and the compound profile thus created is made into the desired shape.

In one known process of this type (Patent Abstracts of Japan, Vol. 17, No. 368 (M-1443) an extruder 27 feeds thermoplastic plastics material 29 directly into a multi-component extrusion head 25. In the extrusion head this plastics material forms a base member which, together with a sealing member of flexible rubber, is co-extruded from the extrusion head. The combined profile 33 travels into a vulcanizing tank 31 in which the sealing member is vulcanized.

In the known so-called "stretch bending" process, the fastening section consists of a metallic reinforcement. The finished compound profile is here bent into the particular shape in which it is finally to be used as a profile part on a motor vehicle using special tools and in a manner which is costly to carry out. Because of the constructional tolerances, during the fitting, one regularly has to carry out costly adjustments to the compound profile which has been stretched and bent.

From Patent Abstracts of Japan, Vol. 5, No. 158 (M-091), it is known per se initially to extrude a tube 2 of polyamide from an extruder 1. The tube is subsequently cooled and passed through a braiding machine 4 which applies a reinforcing layer 5 of brass-plated or zinc-plated wire. A subsequent extruder 6 generates an outer coating 7 of rubber which is vulcanized in a vulcanizing installation 8 and is connected to the wire reinforcement layer 5.

From EP 528 560 A1 it is known per se to supply thermoplastic plastics material 19, 21 and unvulcanized rubber 13, 15 to a multi-component extrusion head 17. The result is a combination profile 10a whose base portion 1 is of rubber. individual surface strips of the base portion are overlaid with thin anti-friction layers 11 of the thermoplastic plastics material.

From EP 483 758 A1 it is known per se to co-extrude a profile 11 having a base portion 12 of rubber and a sealing portion 13 of sponge rubber which has a drainage lip 14. The base portion is fixed by fastening members 4 which extend through mounting holes in a vehicle body panel.

From Patent Abstracts of Japan, Vol. 17, No. 483 (M-1472) it is known per se to lock a sealing lip 4 of a profile to a base member 2 by means of a connecting part 9. In order to assemble the profile the sealing lip 4 is pivoted away so that the base portion 2 can be fixed by screws 10 to the bodywork. Subsequently, the sealing lip 4 is pivoted back, whereupon the coupling members 17, 20 engage in each other.

From DE 37 891 A1 the co-vulcanization of thermoplastic plastics materials and elastomeric materials is known per se. Mention is made of a process involving a two-stage extrusion method, which is expensive in terms of time and production.

From DE 42 19 344 A1 it is known per se to manufacture a part 1 in a shaping tool 4 to 7 by a sandwich injection molding where the part has a core 3 of a resin mixture, chiefly of PP (page 5, lines 50 and 51), and a skin layer 2 of a resin (page 5, line 55), namely a thermoplastic elastomeric material based on styrene, which mainly consists of SEBS (page 5, lines 49 and 50).

From DE 39 34 091 A1 it is known per se to create compound bodies in two steps, the compound bodies consisting of a thermoplastic material reinforced by endless fibers and of rubber, and which can be fixedly connected to each other by vulcanization without the use of adhesive means, primers or glue. As a rule, in the first step, the thermoplastic material is bonded to a fibrous strengthening support, for example a web, UD tape and the like.

From DE 38 35 211 A1 it is known per se to extrude from a common extrusion head 21 a sealing strip 1 consisting of a U-shaped clamping strip 4 of hard rubber, a complete sleeve 5 completely around the clamping strip 4 and having lips 9, 10 of soft rubber and a sealing tube 3 of expanded rubber. The compound profile 1 subsequently passes through a heating station 22 and a hot air zone 23 which completes the vulcanization.

From DE-OS 2 330 605 it is known per se to heat a thermoplastic polyamide synthetic resin material so that at least its surface is softened, and then to bring this surface into contact with a rubber compound, whereafter the softened surface in contact with the rubber compound is allowed to cool off. By this means the rubber compound can be vulcanized.

From the German book "Einstieg in die Kunststoffchemie", 3rd edition, by B. Gnauck and P. Fründt, published by Carl Hanser Verlag, Munich/Vienna, 1991, page 31, it is known per se to thermoform thermoplastic plastics materials. Thermoplastics are formable plastically by the supply of sufficient heat and after cooling off to normal temperatures they become rigid again and can be subjected to loads.

SUMMARY OF THE INVENTION

It is an object of the present invention to improve and to simplify the production and the fitting of profile parts.

This object is achieved by the features of a process as described herein for producing a compound profile part having plasticizable constituents. The part has at least one profile section of elastomeric material, and at least one fastening section of thermoplastic plastics material.

The thermoplastic plastics material is extruded, calibrated and cooled to a temperature compatible for co-extrusion with the elastomeric material. The fastening section and profile section are then co-extruded. The two sections are chemically bonded to each other by co-vulcanization. A desired length of the co-extruded piece is then heated where necessary, depending on the desired shape, until its plasticizable constituents are in the plastic state. The length is then shaped into the desired shape and cooled to the non-plastic state while maintaining the desired shape. Profile parts in accordance with the invention are of particular interest for use in vehicles, in which the original profile has to be deformed three-dimensionally to make profile parts. It is a permanent aim of the vehicle designed to reduce the $c_w$ value and the construction cost of the motor vehicle. The result is that the bodywork is always more strongly rounded and ornamentation and seals which are fitted externally to the bodywork must follow this shaping. For this it is necessary to deform compound profiles in all three coordinates. The process according to the present invention makes it possible to completely eliminate metal as a material for the at least one fastening section. The compound profiles manufactured according to the invention are cut to length and just by heating, shaping in a shaping tool and cooling in the thus formed shape are made into profile parts having extraordinarily high fitting accuracy. The fitting of the profile parts manufactured in this way is considerably facilitated, since the profile parts already have the optimum snug fit for the receiving track on the bodywork. A further advantage in addition to the improved fitting is that such optimized prefabricated profile parts ensure that the sealing effect when fitted is also optimized when one is talking about sealing profiles. Profile parts manufactured in accordance with the invention can, however, also be used for example as rainwater ducts. In all profile parts made in accordance with the invention the fastening section can be designed to be of thermoplastic plastics material and its cross-section can be shaped such that the necessary strength and shape stability results for the whole profile part later. The shape of the profile part achieved after the cooling by the fact that the fastening section is no longer in the plastic state is so-to-speak "frozen in" and does not change any more up to the installation of the profile part. The manufacture of the compound profile by co-extrusion and co-vulcanization gives advantages in terms of technical manufacture.

The extrusion of the fastening section can be effected at temperatures greater than 220° C. In advance of the multi-component injection head the cooling and a calibration of the shaped fastening section to a co-extrusion temperature is effected. Thermoplastic elastomeric materials (TPE) are co-extruded together with the fastening section at temperatures of 150° to 190° C., are cooled to room temperature and calibrated. For the elastomeric materials the extrusion generally takes place at 80° to 120° C., with the temperature input sufficient for the cross-linking in the vulcanization stage, for example in the salt bath or in a fluid bed. Thus, the fastening section and the profile section are each prepared in the compound profile so that they are optimized for their later tasks.

With the use of a coupling material providing the chemical bond, the desired fixed bonding between components can still be achieved by this means.

Particular features of profile parts and additional embodiments manufactured in accordance with the invention are set out herein by way of example.

Further features and advantages of the invention will become apparent from the following description of a number of preferred embodiments in accordance with the invention which are given by way of example and with reference to the drawings.

DESCRIPTION OF PREFERRED EMBODIMENTS

Figures 1, 2:
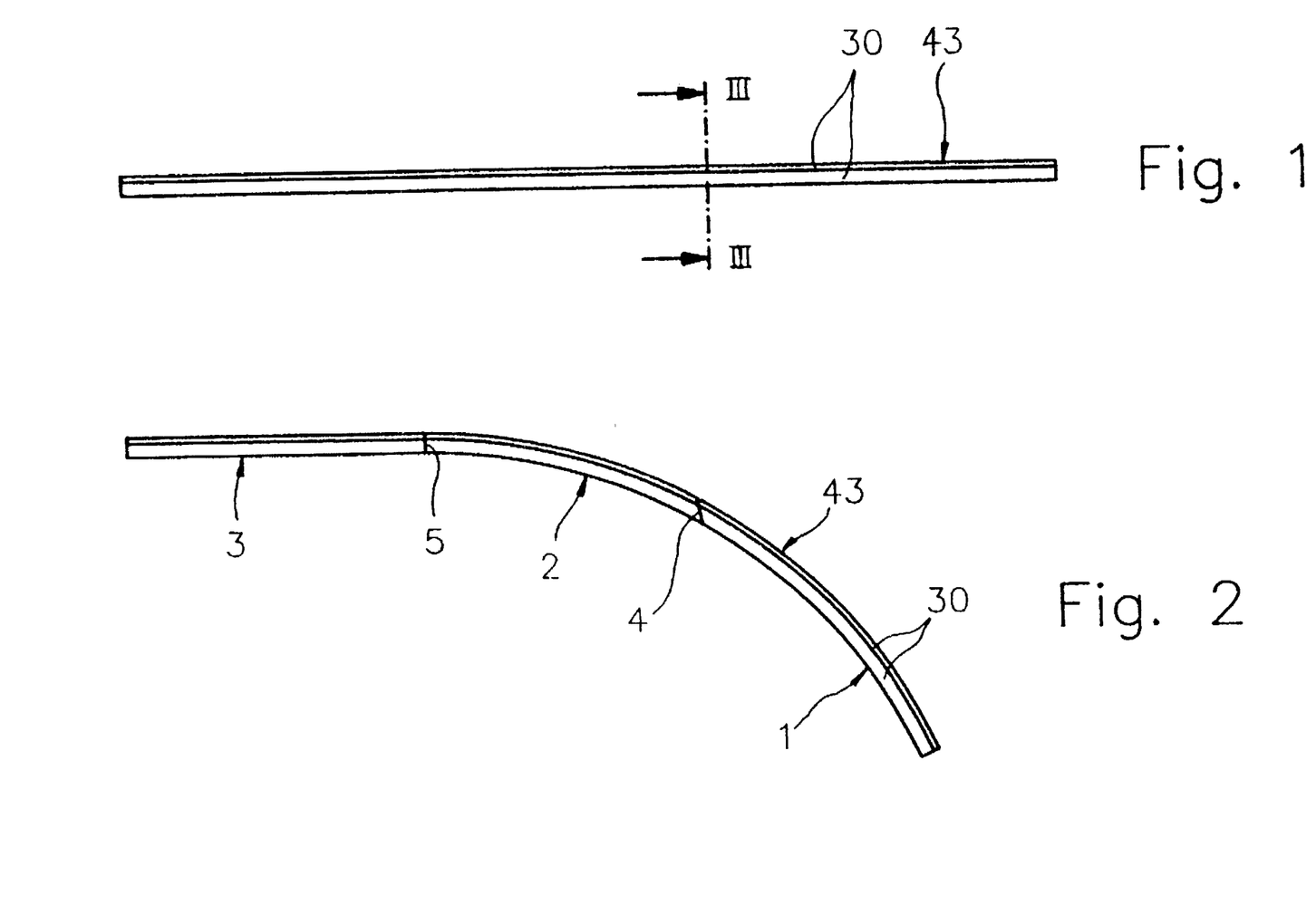
FIG. 1 shows a compound profile before the shaping.
FIG. 2 shows three interactive profile parts produced from the compound profile of FIG. 1.
Figure 3:
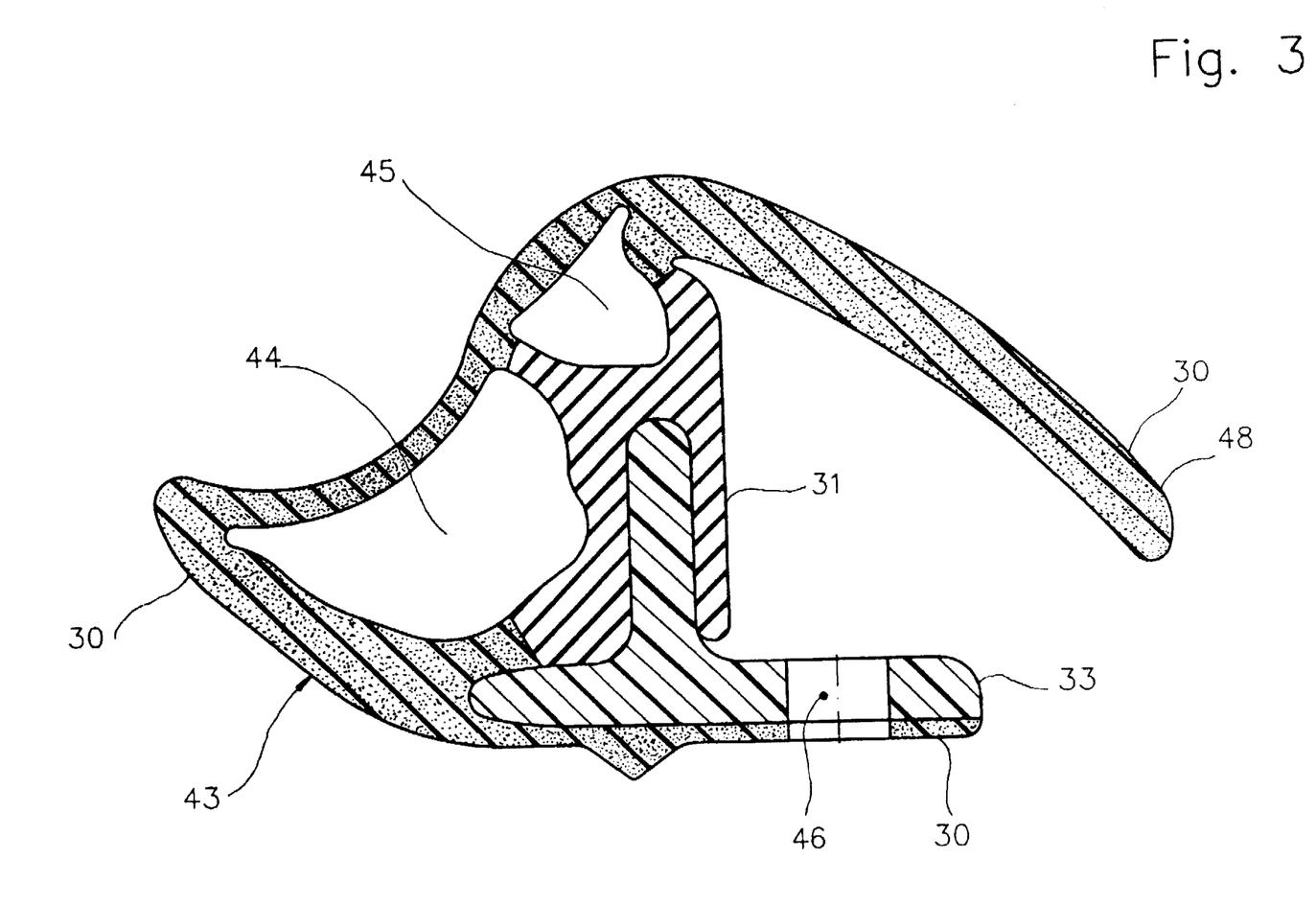
FIG. 3 is the cross-sectional view taken along the line III—III in FIG. 1, on an enlarged scale.

There is shown in FIG. 1 a compound profile 43 which has been produced as a continuous element by co-extrusion and co-vulcanization of several sections. In FIG. 3 only one profile section 30 of expanded rubber is to be seen overlying large peripheral regions of the compound profile 43. The remaining sections will be described in detail in connection with FIG. 3.

In the further processing, pieces of suitable length are cut from the compound profile 43 and are heated in a shaping tool (not shown), possibly only locally, until thermoplastic sections of the compound profile 43 are transformed into the plastic state. Then, the compound profile piece is brought to the desired shape in the shaping tool, and subsequently is cooled until the plasticized sections of the compound profile 43 have again returned to their non-plastic state. One thereby achieves profile parts 1, 2 and 3 as shown in FIG. 2, which are used for example as sealing profiles in the roof cover of a cabriolet vehicle. The end faces of the profile parts 1 to 3 can be closed off, as necessary, in a manner known per se, by caps or other ready-made closures, and in the extended condition of the roof cover will lie in sealing contact with one another along boundary lines 4 and 5. In order to simplify the drawing, the other parts of the cabriolet roof cover have been omitted in FIG. 2.

In practical terms, the invention is suitable not just for the creation of two-dimensional or three-dimensional shaped sealing profiles for the roof frame of folding roof covers or for hard tops. In particular, the invention makes it possible to manufacture in this way for the motor vehicle industry seals which are an accurate fit and stable in shape as rainwater drip channels, water and fresh air chamber seals under the bonnet or hood of motor vehicles, drop glass channel profiles and cantrail seals for saloon cars. In all cases, at least one fastening section 33 and 55 of a thermoplastic plastics material assumes the function of the previous metallic fixing rail.

The heating of the compound profile in order to achieve the plastic state of its plasticizable constituents can be effected for example by a heating radiator, hot air blower or high frequency radiation.

In all the Figures of the drawings the same parts are indicated by the respective same reference numerals.

FIG. 3 shows a compound profile 43 in which the profile section 30 is of expanded rubber and almost completely encloses the fastening section 33. In the interior of the profile section 30 there is arranged a profile section 31 which likewise consists of an elastomer, in this case of soft rubber, and it has a chemical bond with the profile section 30 at the boundary surfaces. Between the profile sections 30 and 31 are throughgoing hollow chambers 44 and 45 to improve the elasticity properties of the compound profile 43.

The fastening section 33 in FIG. 3 has a substantially T-shaped cross-section and is partially embedded in the profile sections 30, 31. Here again, at the boundary surfaces, a sufficiently strong chemical bond is created on the basis of the aforesaid co-extrusion and co-vulcanization.

At its lower free end the compound profile 43 shown in FIG. 3 has mounting holes 46 which are arranged spaced from one another in the longitudinal direction. Through these mounting holes 46 are inserted respective fastening elements which can be connected to a part of the bodywork (not shown). A lip 48 of the profile section 30 which is made of expanded rubber overlies the mounting holes 46. The compound profile 43 serves for example as a sealing profile for the upper transverse section of the roof frame of a folding cover or hard top for a cabriolet or for a coupé type vehicle.

Figure 4:
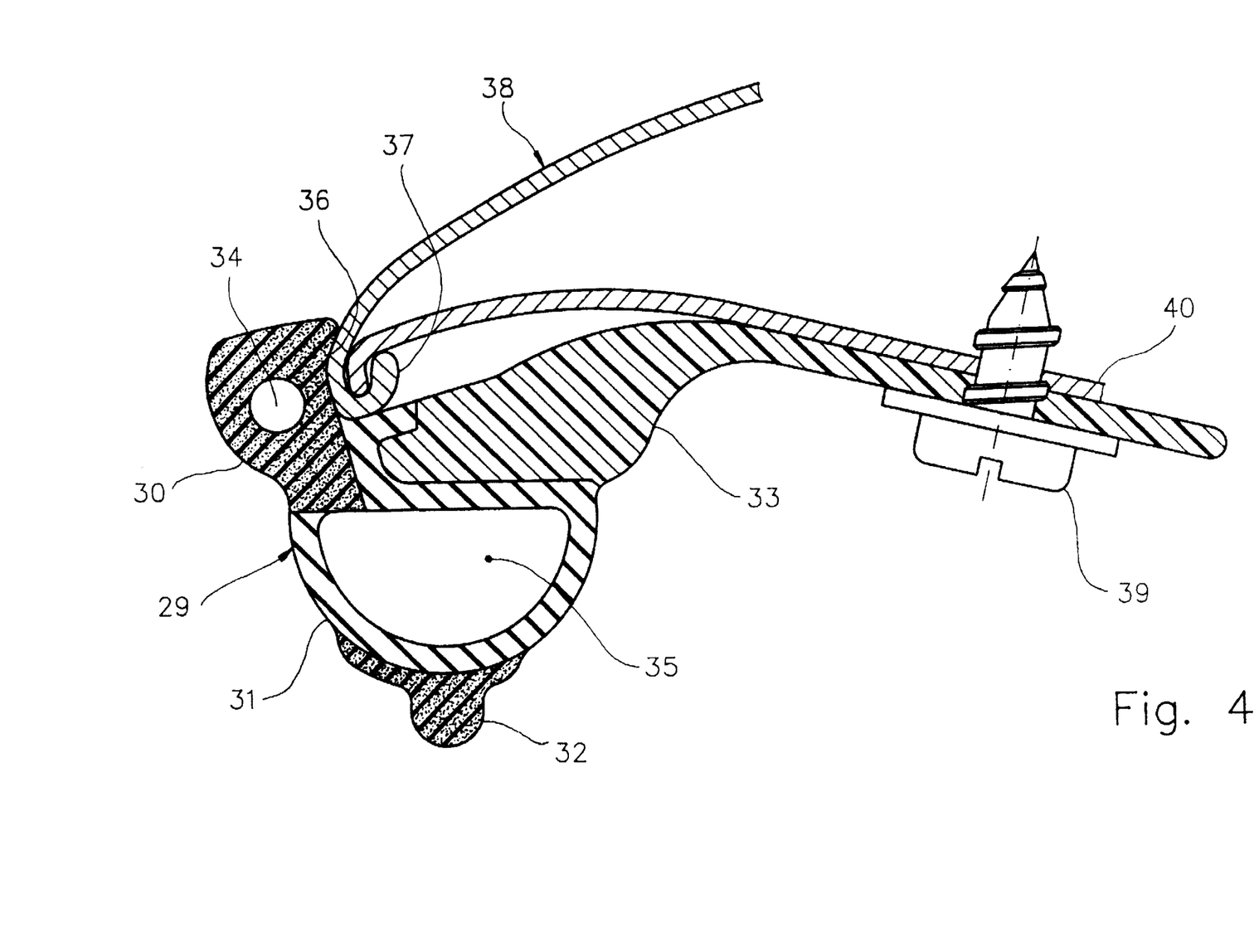
FIG. 4 is a cross-sectional view through another fitted profile part.

FIG. 4 shows another compound profile 29 which is composed of four profile sections 30 to 33. The profile sections 30 and 32 are of expanded rubber, with the profile section 30 having a through-going hollow chamber 34 provided therein, in order to improve its spring properties.

The profile section 31 is likewise provided with a through-going hollow chamber 35 in order to achieve optimum spring properties. The profile section 31 consists of an elastomer, like the profile sections 30 and 32.

As elastomers for the profile sections, for example 30 to 32, the following materials for example can be used in all the Figures:

expanded rubber with a Shore-A hardness of 10 to 30 or soft rubber with a Shore-A hardness of 30 to 70, both manufactured for example from
EPDM,
SBR,
CR,
ECO,
blends (mixtures) of EPDM with SBR with an EPDM content of 20 to 90% by weight,
blends of EPDM with SBR and/or polyoctenamer, or NBR.

The following thermoplastic elastomeric materials (TPE) can also be used by way of example:

TPE based on styrene ethylene butylene styrene (S-EB-S),
TPE based on styrene butadiene styrene (SBS),
TPE based on styrene isoprene styrene (SIS),
TPE based on elastomeric compositions as TPO blends or TPO alloys, for example of cross-linked EPDM/propylene blends (EPDM/PP) or
ethylene vinyl acetate/vinylidene chloride (EVA/PVDC) or TPE based on thermoplastic polyurethanes (TPU).

The profile sections, for example 30 to 32, are each formed by an elastomer extruder and subsequently are vulcanized to one another along the boundary surfaces which are in contact with each other. Thus, a chemical bond of sufficient strength is created between the respective profile section.

The fastening section 33 consists in contrast of a thermoplastic plastics material in all Figures. The following materials can be used for this, example:

PPE polyphenylene ether
PP polypropylene
PE (LDPE, low density PE)
PE (HDPE, high density PE)
PIB polyisobutylene
PS polystyrene
PA polyamide
PC polycarbonate
PETP polyethylene terephthalate
POM polyoxymethylene,
  epoxy resin
  phenol formaldehyde resin
PES polyester
PPO polyphenylether or
PVC polyvinylchloride.

These plastics materials can be used with or without reinforcement, for example by carbon fibers or glass fibers.

The fastening section 33 is produced by a plastics material extruder with subsequent calibrating and cooling regions, and is co-extruded with the profile sections 30 to 32 in a multi-component extrusion head. By means of the subsequent co-vulcanization a sufficiently strong chemical bond is created between the profile sections 31 and 33.

The compound profile 29 which is thus created as shown in FIG. 4 is held on the one hand by an anchor groove 36 at a folded edge 37 of a motor vehicle bodywork panel 38, and on the other hand by a metal-cutting screw 39 which penetrates through the profile section 33 and into a bodywork panel 40. Thus, with the simplest means, one achieves a stable connection of the compound profile 29 to the bodywork 38. The compound profile 29 serves for example as a sealing profile for the side parts of the roof frame of a folding top or hard top for a cabriolet or a coupé type vehicle.

Figure 5:
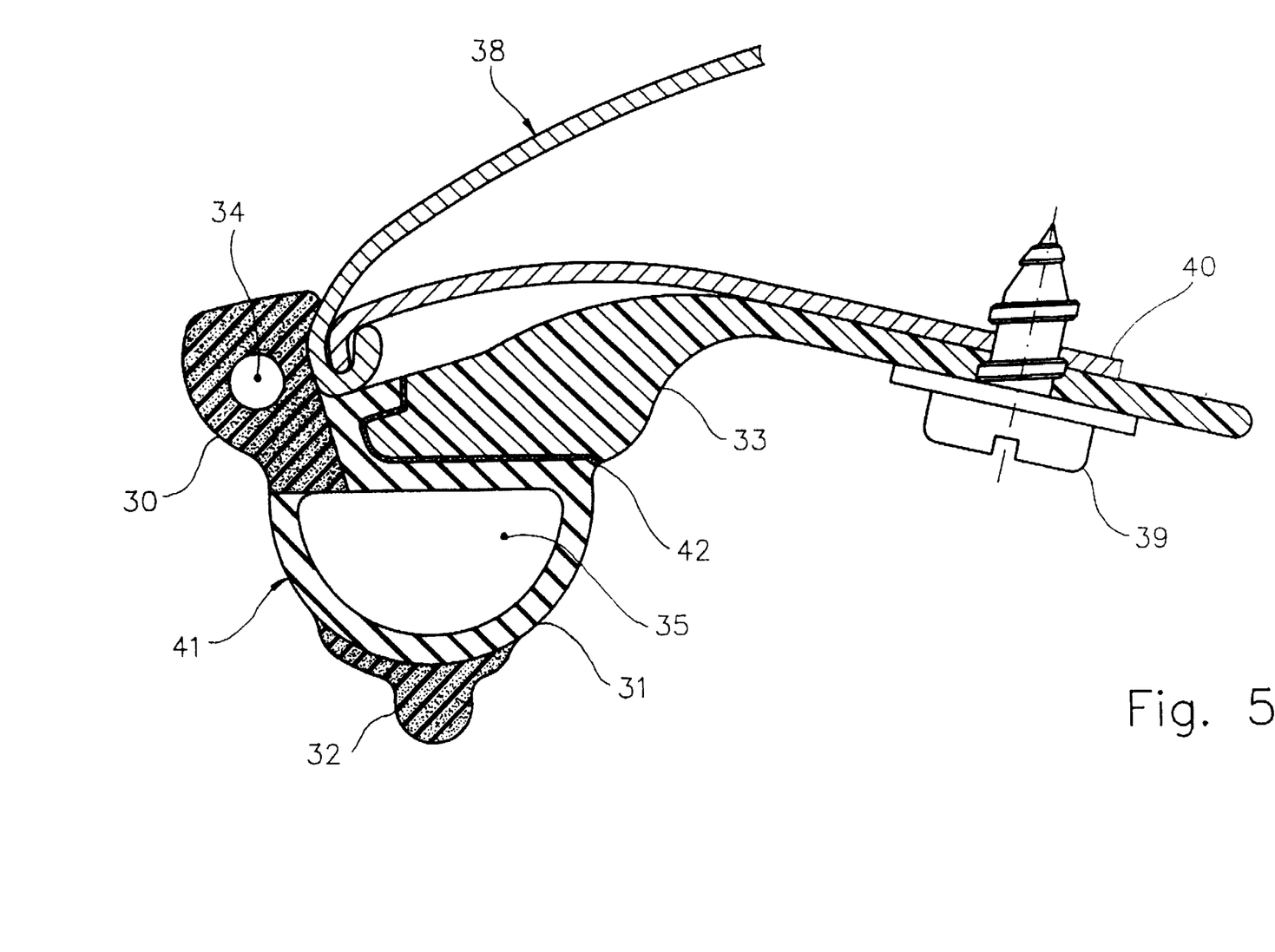
FIG. 5 is a cross-section through a further fitted profile part.

FIG. 5 shows a compound profile which is structured and formed substantially in the same way as the compound profile 29 shown in FIG. 4. Again, the connection to the motor vehicle bodywork 38 is accomplished in the same way as in FIG. 4. The difference as compared with FIG. 4 lies in the fact that between the profile sections 31 and 33 there is now provided a layer of a coupling material 42. The purpose of the coupling material 42 is to improve the chemical bond between the elastomeric material of the profile section 31 and the thermoplastic plastics material of the fastening profile 33. The following materials can be used for example as the coupling material 42:

EPDM in a blend with PP, PE, PS, PIB, PES, as well as other polymers from the aforesaid listing of the materials for the fastening profile 33, in a proportion by weight of <20%,
blends of EPDM-CR-SBR-polyoctenamer or EPDM compounds with resin additions (for example epoxy resins).

If the profile section 32 is of a TPE, then a polypropylene primer can be used for example as coupling material 42.

Figure 6:
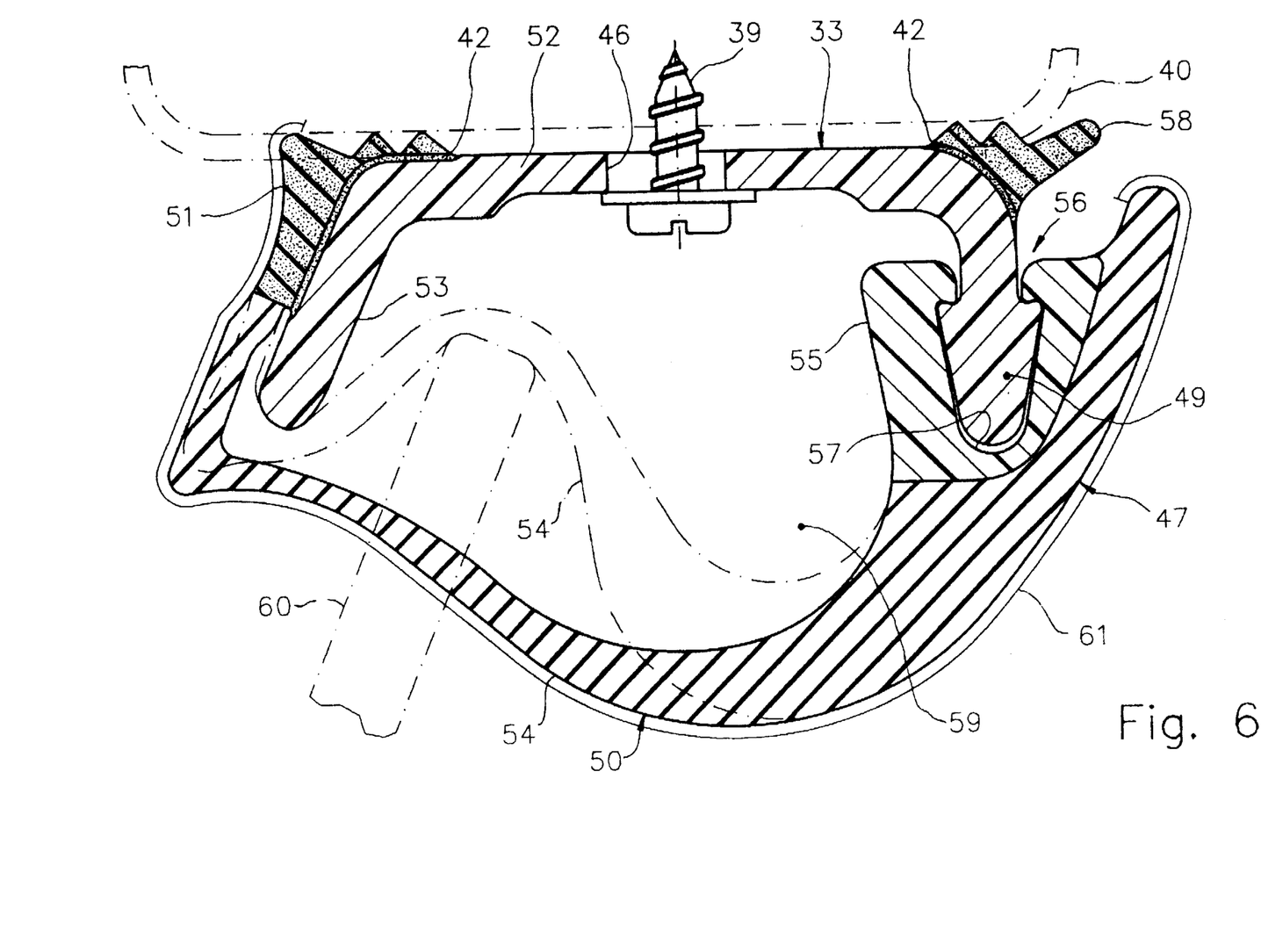
FIG. 6 is a cross-section through yet another profile part.

FIG. 6 shows yet another compound profile 47 which is particularly suitable as a sealing profile for the front transverse section and the side parts of the roof frame of a folding cover or hard top for a cabriolet or for a coupé type vehicle.

The compound profile 47 comprises a fastening section 33 of a thermoplastic plastics material which has a substantially U-shaped cross-section. The fastening section 33 is provided with a plurality of mounting holes 46 which are arranged spaced from one another in the longitudinal direction. These mounting holes each have all-round play with reference to metal-cutting screws 39. Thus, the compound profile 47 can be displaced relative to the screws 39 within limits in the longitudinal and transverse directions during the fitting, until the optimum position for the compound profile 47 has been achieved. Then the screws are tightened in place.

One longitudinal end of the fastening section 33 is formed as a first coupling member 49. A masking profile section 50 is vulcanized onto the fastening section 33 on its lengthwise side which lies opposite to the first coupling member 49. The masking profile section 50 includes an additional profile section 51 of expanded rubber which is vulcanized onto a base 52 and onto a leg 53 of the fastening section 33 by means of the coupling material 42. A constituent part of the masking profile section 50 is a further profile section 54 of soft rubber which overlies the fastening section 33 and which has one longitudinal end vulcanized to the additional profile section 51 and has its other longitudinal end vulcanized to a coupling profile section 55. The coupling profile section 55 consists of a thermoplastic plastics material and comprises a second coupling member 57 which forms a snap closure 56 with the first coupling member 49.

A sealing profile section 58 of expanded rubber is vulcanized by means of the coupling material 42 to the side of the fastening section 33 which lies opposite the additional profile section 51.

In FIG. 6 there is indicated in chain-dotted lines, at the top, the bodywork panel 40 to which the compound profile 47 is to be fitted. The toothed parts of the profile sections 51, 58 are pressed sealingly against the bodywork panel 40 and are correspondingly deformed. Until the aforementioned fitting of the metal-cutting screws 39, the snap closure 56 is free and the further profile section 54 hangs downwards out of the way of the screwdriver. After the fitting of the screws 39 the further profile section 54 with the coupling profile section 55 is folded upwards and the snap closure 56 is closed. This creates a hollow chamber 59 into which, due to a window 60 of the motor vehicle, the further profile section 54 can be deformed upon putting the roof covering in place, as is indicated by chain-dotted lines in FIG. 6.

In FIG. 6 the major part of the external surface of the additional profile section 51 and of the further profile section B4 are overlaid with a sliding layer 61 which is indicated as being comparatively thick but which in practice is just a thin coating. The sliding layer 61 reduces the sliding friction between the further section 54 and the window 60.

While presently preferred embodiments of the invention have been described with reference to FIGS. 2–6, it will be apparent that many modifications and variations may be effected without departing from the scope of the novel concepts of the present invention.

What is claimed is:

1. A process for producing a compound profile part having plasticizable constituents, said profile part having at least one profile section made of an elastomeric material and at least one fastening section made of a thermoplastic plastics material; said process comprising the steps of:
   (a) extruding said thermoplastic plastics material;
   (b) subsequently calibrating said thermoplastic plastics material extruded in step (a), and cooling said thermoplastic plastics material extruded in step (a) to a temperature compatible for co-extrusion with said elastomeric materials;
   (c) co-extruding continuous lengths of said thermoplastic plastics material calibrated and cooled in step (b) and said elastomeric material for forming the compound profile;
   (d) chemically bonding said thermoplastic plastics material and said elastomeric material to each other by covulcanization;
   (e) cutting said continuous co-extruded lengths to a length;
   (f) heating said length where necessary depending upon the location of a desired change in shape until its plasticizable constituents are in a plastic state;
   (g) shaping said length after step (f) in a shaping tool into the desired shape; and
   (h) cooling said length to a non-plastic state of the plasticizable constituents while maintaining the desired shape of step (g).

2. A process according to claim 1 comprising the further step of using a coupling material in the co-extrusion step to promote the chemical bond between said thermoplastic plastics material and said elastomeric material.

3. A profile part made by the process according to claim 1 wherein
   said fastening section of thermoplastic plastics material is adopted to be fastenable to a bodywork panel; and said profile section comprises a first profile section made of soft rubber vulcanized to said fastening section.

4. A profile part made by the process according to claim 2 wherein
   said fastening section of thermoplastic plastics material is adapted to be fastenable to a bodywork panel; and said profile section comprises a first profile section made of soft rubber vulcanized to said fastening section.

5. A profile part in accordance with claim 3 further comprising at least one additional profile section of expanded rubber vulcanized to said first profile section, said additional profile section being arranged to be coupled to the bodywork panel.

6. A profile part in accordance with claim 4 further comprising at least one additional profile section of expanded rubber vulcanized to said first profile section, said additional profile section being arranged to be coupled to the bodywork panel.

7. A profile part made by the process according to claim 1 wherein
   said fastening section of thermoplastic plastics material is substantially T-shaped;
   said profile section comprises a first profile section made of soft rubber vulcanized to a first portion of a periphery of said fastening section; and
   said profile part further comprises an additional profile section of expanded rubber vulcanized to a second portion of the periphery of said fastening section and to said first profile section.

8. A profile part made by the process according to claim 2 wherein
   said fastening section of thermoplastic plastics material is substantially T-shaped;
   said profile section comprises a first profile section made of soft rubber vulcanized to a first portion of a periphery of said fastening section; and
   said profile part further comprises an additional profile section of expanded rubber vulcanized to a second portion of the periphery of said fastening section and to said first profile section.

9. A profile part in accordance with claim 7 wherein said additional profile section encloses substantially the whole remaining compound profile, and along one longitudinal edge thereof extends a lip above mounting holes for the receipt of fastening elements, wherein the mounting holes are located in the fastening section and another longitudinal edge of said additional profile section.

10. A profile part in accordance with claim 8 wherein said additional profile section encloses substantially the whole remaining compound profile, and along one longitudinal edge thereof extends a lip above mounting holes for the receipt of fastening elements, wherein the mounting holes are located in the fastening section and another longitudinal edge of said additional profile section.

11. A profile part made by the process according to claim 1 wherein
   said fastening section of thermoplastic plastics material is substantially U-shaped and has a base that has mounting holes for receiving fastening elements;
   said fastening section includes a longitudinal end forming a first coupling member; and
   said profile part further comprises a masking profile section vulcanized to said fastening section on a longitudinal side of said fastening section which lies opposite said first coupling member, and
   wherein said masking profile section has a free longitudinal edge provided with a second coupling member which forms a snap closure with the first coupling member.

12. A profile part made by the process according to claim 2 wherein
   said fastening section of thermoplastic plastics material is substantially U-shaped and has a base that has mounting holes for receiving fastening elements;

said fastening section includes a longitudinal end forming a first coupling member; and said profile part further comprises a masking profile section vulcanized to said fastening section on a longitudinal side of said fastening section which lies opposite said first coupling member, and wherein said masking profile section has a free longitudinal edge provided with a second coupling member which forms a snap closure with the first coupling member.

13. A profile part in accordance with claim 11 wherein said masking profile section includes a further profile section of soft rubber which can overlie the fastening section.

14. A profile part in accordance with claim 12 wherein said masking profile section includes a further profile section of soft rubber which can overlie the fastening section.

15. A profile part in accordance with claim 13 wherein said further profile section includes a longitudinal edge which is vulcanized to an additional profile section of expanded rubber, said additional profile section being vulcanized to the fastening section.

16. A profile part in accordance with claim 14 wherein said further profile section includes a longitudinal edge which is vulcanized to an additional profile section of expanded rubber, said additional profile section being vulcanized to the fastening section.

17. A profile part in accordance with claim 11 wherein said second coupling member is formed as part of a coupling profile section comprising thermoplastic plastics material, and said coupling profile section is vulcanized to the masking profile section which comprises elastomeric material.

18. A profile part in accordance with claim 12 wherein said second coupling member is formed as part of a coupling profile section comprising thermoplastic plastics material, and said coupling profile section is vulcanized to the masking profile section which comprises elastomeric material.

19. A profile part in accordance with claim 13 wherein said second coupling member is formed as part of a coupling profile section comprising thermoplastic plastics material, and said coupling profile section is vulcanized to the masking profile section which comprises elastomeric material.

20. A profile part in accordance with claim 15 wherein said second coupling member is formed as part of a coupling profile section comprising thermoplastic plastics material, and said coupling profile section is vulcanized to the masking profile section which comprises elastomeric material.

21. The process for producing the compound profile of claim 2 wherein the extrusion of the thermoplastic plastics material of step (a) is effected at a temperature greater than about 220° C., and the co-extrusion in step (c) is effected at a temperature below about 190° C.

* * * * *